United States Patent [19]

Buker

[11] 3,966,459
[45] June 29, 1976

[54] PROCESS FOR THERMAL DISSOCIATION OF MOLYBDENUM DISULFIDE

[75] Inventor: Donald O. Buker, Denver, Colo.

[73] Assignee: Amax Inc., New York, N.Y.

[22] Filed: Sept. 24, 1974

[21] Appl. No.: 508,848

[52] U.S. Cl. .................................. 75/84; 75/90 R
[51] Int. Cl.$^2$ ................. C22B 34/00; C22B 9/14
[58] Field of Search ............ 75/84, 91, 7, 89, 90 R, 75/92

[56] References Cited
UNITED STATES PATENTS

| | | | |
|---|---|---|---|
| 899,219 | 9/1908 | Johansson | 75/90 R |
| 1,079,777 | 11/1913 | Lederer | 75/91 |
| 1,310,724 | 7/1919 | Westberg | 75/91 |
| 2,227,176 | 7/1938 | Berghaus | 75/225 |
| 2,227,177 | 12/1940 | Berghaus | 75/225 |
| 2,776,887 | 1/1957 | Kelly | 75/211 |
| 2,834,671 | 5/1958 | Nachtman | 75/84 |
| 3,020,151 | 2/1962 | Nachtman | 75/84 |
| 3,152,886 | 10/1964 | Nachtman | 75/84 |
| 3,196,004 | 7/1965 | Kunda | 75/84 |
| 3,288,593 | 11/1966 | Smith | 75/84 |
| 3,288,594 | 11/1966 | Smith | 75/84 |
| 3,330,646 | 7/1967 | Heinen | 75/84 |
| 3,865,573 | 2/1975 | Neumann | 75/84 |

FOREIGN PATENTS OR APPLICATIONS 294,795    8/1928    United Kingdom

OTHER PUBLICATIONS

Scholz, et al., Transactions of the Metallurgical Society of Aime, vol. 221, April 1961, pp. 356–364.

M. Guichand, Comptes Rendus.Hebomadaires des Seances de l'Academie des Sciences, 1896, vol. 122, pp. 1270–1270, 1899, vol. 129, pp. 1239–1242.

Parravano, et a., Gazzetta Chimica Italiana, 1928, vol. 58, pp. 279–289.

Picon, Bull. Soc. Chim. France, 1929, vol. 45, pp. 907–913.

Primary Examiner—Benjamin R. Padgett
Assistant Examiner—Donald P. Walsh
Attorney, Agent, or Firm—Harness, Dickey & Pierce

[57] ABSTRACT

A process for preparing metallic molybdenum of relatively high purity by agglomerating a finely-particulated molybdenite concentrate consisting predominantly of molybdenum disulfide into a plurality of briquettes and heating the briquettes at an elevated temperature under vacuum for a period of time sufficient to effect a dissociation of the molybdenum disulfide and an extraction of the volatile constituents in the briquettes, including sulfur, heat treating and purifying the residual porous metallic molybdenum briquettes by subjecting them to a hydrogen gas sweep at an elevated temperature under vacuum, effecting a further extraction of residual sulfur, and thereafter recovering the heat treated briquettes which contain upward of 90% metallic molybdenum.

16 Claims, 1 Drawing Figure

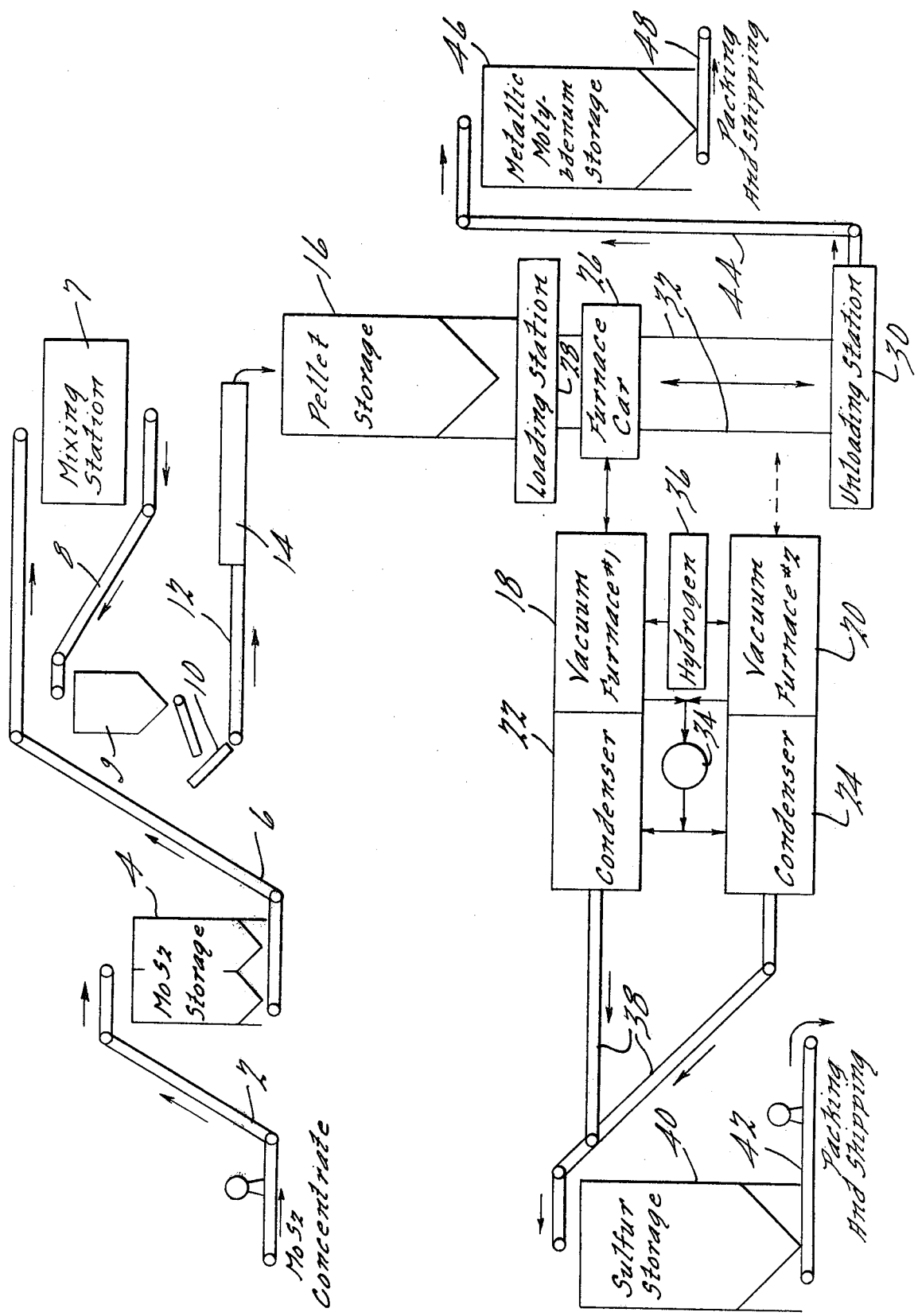

PROCESS FOR THERMAL DISSOCIATION OF MOLYBDENUM DISULFIDE

BACKGROUND OF THE INVENTION

Molybdenum is not found in nature as a free element, but rather, is predominantly found in the earth's crust in the form of molybdenite ($MoS_2$). Perhaps the largest known source of molybdenite is at Climax, Colo., wherein the ore body comprises a highly silicified and altered granite, through which the molybdenite is distributed in the form of very fine-sized veinlets. Conventionally, the concentration of molybdenite in the ore as mined is in the order of 0.3 to 0.6 percent, which is increased through various beneficiation processes, such as an oil flotation extraction operation, to a concentration of molybdenum disulfide usually in excess of 80 percent by weight. Such oil flotation extraction operations conventionally employ pine oil and petroleum oil in combination with suitable wetting agents to effect a separation of the molybdenum disulfide constituent from the gangue which consists predominantly of silica.

In order to recover the metallic molybdenum constituent from the molybdenite concentrate, it has heretofore been common practice to subject the molybdenite concentrate to a roasting operation in the presence of air to convert the material to molybdenum trioxide, and the resultant oxidized concentrate is thereafter further purified by sublimation and in some instances, is still further purified by conversion of the molybdic oxide to ammonium molybdate. In the last stage, the purified molybdenum compound is reduced through a multiple-stage hydrogen reduction process to a relatively pure metallic state. It will be apparent that the foregoing processing sequence in accordance with prior art practices is costly and time consuming. Because of this, various alternative techniques have been proposed for producing metallic molybdenum including a direct thermal dissociation of molybdenite, but such prior art techniques have been unsatisfactory, particularly due to the low purity and/or high cost of the metallic molybdenum produced.

The present invention provides for a substantial simplification in the production of metallic molybdenum by a direct dissociation of the molybdenite into its component elements, enabling a recovery of sulfur and other normally-occurring contaminating elements as useable by-products and producing metallic molybdenum in a relatively pure form.

SUMMARY OF THE INVENTION

The benefits and advantages of the present invention are achieved by an improved process by which metallic molybdenum of relatively high purity is produced by a high temperature thermal dissociation of a molybdenite concentrate, with or without a reducing agent, in a vacuum followed by a hydrogen gas sweep at the end of the vacuum heat treating step. The molybdenite concentrate is preliminarily agglomerated into pellets or briquettes employing a volatile binder, thereby facilitating subsequent handling of the molybdenite and an escape of the volatile constituents therein, including sulfur, during the thermal dissociation reaction. The thermal dissociation reaction is carried out at a temperature broadly ranging from about 2500°F up to about 3100°F at vacuums ranging from about 10 torr up to about 0.1 torr for periods of time sufficient to provide for a substantially complete dissociation of the molybdenum disulfide, gangue and associated metal present in the agglomerated concentrate. Thereafter, a hydrogen gas sweep heat treatment of the porous briquettes is employed to further remove and reduce the concentration of residual impurities present. The resultant sintered, dense briquettes comprised predominantly of metallic molybdenum, and preferably containing less than about 100 parts per million (ppm) sulfur, are cooled to a temperature below about 570°F, whereafter they are extracted from the vacuum furnace.

Additional benefits and advantages of the present invention will become apparent upon a reading of the description of the preferred embodiments, the specific examples provided and the accompanying drawing.

BRIEF DESCRIPTION OF THE DRAWING

The drawing comprises a schematic flow sheet depicting the important steps of the process comprising the present invention including the recovery of elemental sulfur and other byproducts that were present in the original concentrate.

DESCRIPTION OF THE PREFERRED EMBODIMENTS

The composition and concentration of the various feed materials, products, by-products and intermediate by-products are described in the specification and subjoined claims in terms of percentages by weight unless clearly indicated to the contrary.

Sintered, dense pellets or briquettes of metallic molybdenum of relatively high purity are achieved in accordance with the present process by the direct thermal dissociation of a commercial molybdenite concentrate in an environment devoid of oxygen and in a substantial vacuum at temperatures ranging from as low as about 2500°F up to about 3100°F. The thermal dissociation reaction of molybdenite is believed to occur in two discrete steps:

a. $4MoS_2 \rightarrow 2Mo_2S_3 + S_2$ (gas)
b. $2Mo_2S_3 \rightarrow 4Mo + 3S_2$ (gas)

The gaseous or vaporized sulfur and other valuable constituents present in the concentrate evolved during the thermal dissociation reaction can readily be recovered in a condenser and comprise valuable by-products of the process. In addition to sulfur, other constituents which are also volatilized and removed from the briquettes to effect purification of the metallic molybdenum residue include: silica, iron compounds, aluminum compounds, calcium compounds, lead compounds and oxygen-containing compounds, as well as other conventional impurities normally found in ore deposits containing molybdenite. The substantial reduction in the content of such contaminating constituents renders the resultant metallic molybdenum briquettes eminently suitable in many instances without any further purification for direct use as a metallurgical alloying constituent and as a feed material for preparing technical grade molybdenum compounds.

The feed material to the thermal dissociation process comprises a finely-particulated molybdenite which preferably has been concentrated so as to comprise predominantly molybdenum disulfide. In accordance with conventional practices, molybdenum disulfide containing feed stocks are commercially available as concentrates derived from various ore beneficiation processes to reduce the gangue and other contaminating constituents to concentrations generally less than about 40 percent by weight, with the balance comprising molybdenum disulfide. In accordance with a preferred practice, the molybdenite ore as mined is subjected to conventional flotation-extraction processes which are carried out until the silica content of the powdered ore is usually less than about 20 percent, preferably less than about 8 percent, and sometimes as low as about 2 percent.

It is also possible to subject the ore to repeated grinding and flotation extraction cycles until the ore is reduced to an average particle size usually ranging from about 10 microns to about 250 microns and whereby the silica content can be still further reduced to a level of as little as about 0.3 percent to about 0.5 percent. High purity molybdenite concentrates of the latter type are particularly suitable for use in the formulation of lubricants. Still further increases in the purity of the molybdenite concentrate can be achieved by subjecting the flotation extracted concentrate to an aqueous acid leaching process employing hydrofluoric acid, whereby the silica content is still further reduced to levels as low as about 0.02 percent. A process of the foregoing type is described in U.S. Pat. No. 3,101,252, owned by the assignee of the present invention and the teachings of which are incorporated herein by reference. Because of the volatilization of the impurities in the molybdenite concentrate, including the silica or gangue constituents, in accordance with the practice of the present invention, it generally is not necessary to subject the molybdenite concentrate to purification treatments to reduce the silica content to a level below about 20 percent.

The molybdenite concentrate derived from the oil flotation extraction process conventionally contains up to about 16 percent water and up to about 7 percent flotation oils, which usually comprise hydrocarbon oils such as pine oil and other oily substances of the type disclosed in U.S. Pat. No. 2,686,156. A removal of such flotation oils is not necessary since they are volatilized and/or thermally decompose during the thermal dissociation reaction. It is important, however, that the molybdenite concentrate in a finely-particulated form is first agglomerated into briquettes or pellets of a size which facilitates their handling and also assures the formation of a porous bed to permit an escape of the sulfur and other volatile constituents from the agglomerates during the thermal dissociation reaction. The particular configuration and size of the pellets is not critical, and to some extent, will be dictated by the particular type of agglomerating process and equipment employed. Generally, pellets of a spherical configuration, such as derived from a disc-type pelletizing process, having diameters ranging from about one-eighth inch up to about one-half inch are satisfactory.

It is also important that the briquettes or pellets formed are of sufficient green strength so that they will not crush or deform when loaded as a static three-dimensional bed in a vacuum furnace, thereby assuring the retention of the porosity of the bed through which the volatile constituents can escape during the thermal dissociation reaction. Adequate green strength to enable a preliminary handling of the pellets, as well as providing the requisite final strength necessary during the initial stage of the thermal dissociation reaction can be imparted to the agglomerates by incorporating any one of a variety of inexpensive binder materials which volatilize without leaving any substantial residue under the temperature and vacuum conditions present in the reactor. For this purpose, binder materials including starches, gelatines, sugars, molasses, $Na_2Si_{O3}$, etc., can be employed of which a dilute molasses solution has been found as being particularly satisfactory. Such binder materials are generally incorporated in amounts ranging from about 2 percent up to about 10 percent, with the specific amount used in any particular situation varying in consideration of such factors as the particular size of the molybdenite concentrate particles, the manner of agglomerating the concentrate and the size of the resultant pellets desired.

It is also contemplated in accordance with the practice of the present process that in addition to volatile binders, the pelletized molybdenite feed stock may further include a volatile particulated filler material which is adapted to volatilize during the thermal dissociation reaction, imparting increased porosity to the briquettes, thereby further facilitating an extraction of the other volatile constituents therein and enhancing the purity of the metallic molybdenum product. Such volatile filler materials may range in size from about 10 microns to about 100 mesh (147 microns) and may be of regular or irregular configuration. The volatile filler may be solid in nature or may be porous, tubular, or hollow, thereby reducing the weight of material that must be volatilized to achieve a given porosity. Volatile filler materials may be comprised of any inexpensive substance that will volatilize without residue under the thermal dissociation conditions employed and without undergoing a violent or abrupt gasification, which might otherwise result in fracture, attrition or crumbling of the pellets during the initial phases of the thermal dissociation reaction. Particularly satisfactory materials are wood flour, sulfur, walnut shell flour, particles, beads and fibers of a thermoplastic resin which decompose without residue under the temperature conditions employed; microballoons composed of phenolic resins, and the like. The specific quantity of filler employed can be varied over wide limits to provide the desired volumetric percentage of potential porosity attributable to the filler and will vary depending on weight, size and filler configuration. The upper limit of filler that can be used is established by that at which inadequate pellet strength is obtained to prevent premature fracturing during the preliminary stages of the thermal dissociation reaction.

Referring now to the drawing, a typical processing sequence is depicted whereby a molybdenum disulfide containing particulated concentrate is transferred by a conveyor, indicated at 2, into a storage hopper 4, from which it is withdrawn as required by means of a conveyor 6 to a mixing station 7, at which appropriate quantities of binder and filler are added and mixed with the feed material, and then by conveyor 8 to a surge hopper 9. The surge hopper 9 functions to provide for a uniform flow of feed material to a disc-type pelletizing apparatus, indicated at 10, by which the particulated feed material is agglomerated into pellets of the desired size and shape. The green pellets are transferred from the pelletizer 10 by a conveyor 12 to an oven 14, in which they are dried and thereafter are transferred to a pellet storage hopper, indicated at 16.

In the embodiment illustrated in the drawing, the thermal dissociation reaction is carried out on a batchwise basis employing two vacuum furnaces 18, 20, which are alternately placed on-stream to enable a removal of the recovered sulfur and other constituents from the associated condenser, indicated at 22 and 24, respectively, of each furnace, and to prepare the respective furnace for the next charge. A charging of the pelletized feed stock into the vacuum furnaces is accomplished by a shuttle or furnace car 26 which is laterally movable to and from a loading station, indicated at 28, and an unloading station 30 on rails 32 and is also longitudinally movable from a position on the rails to a position within the furnace 18 or 20. It is also contemplated that two furnace cars can be provided and their movements coordinated between the loading and unloading stations and the furnaces to provide a substantially continuous flow of metallic molybdenum product. It is also contemplated that in lieu of the batchwise operation shown, the thermal dissociation of the pelletized feed stock can also be achieved on a substantially continuous basis as may be desired.

The pelletized feed stock, upon entry into the furnace, is heated to an elevated temperature in the absence of oxygen and to relatively high vacuum in accordance with the conditions subsequently to be described so as to effect a thermal dissociation and extraction of the volatile constituents, including the sulfur constituent, which is recovered in the condensers 22, 24. A vacuum pump 34, preferably of a steam ejector type, is used for evacuating the furnaces and for transferring the vaporized constituents to the condensers. During or at the conclusion of the thermal dissociation reaction, a hydrogen heat treatment of the residual pellets is achieved, whereby a hydrogen gas sweep from a supply, indicated at 36, is admitted into the furnace under operation, causing a further extraction of residual contaminating elements therein.

The recovered volatile constituents comprised predominantly of sulfur are transferred from the condensers 22, 24 by means of conveyors 38 to a sulfur storage hopper 40, from which it is withdrawn as desired and transferred for packing and shipping by means of a conveyor 42. The porous metallic molybdenum pellet product, on the other hand, is dumped from the furnace car at the unloading station 30 and is transferred by means of a conveyor 44 to a product storage hopper 46, from which it is withdrawn as required for packing and shipping by means of a conveyor 48.

The thermal dissociation of the pellets in the vacuum furnace proceeds in accordance with the reaction equation as previously set forth and wherein the sulfur, silica, binder, volatile filler, if any, and other contaminating constituents are converted to the gaseous form and are extracted by the vacuum pump. The temperature of the thermal dissociation reaction may range from as low as about 1800°F (982°C) to as high as 3100°F (1704°C), and preferably from about 2500°F to about 3100°F. Temperatures below about 2500°F are commercially unsatisfactory due to the slow rate of decomposition of the molybdenum disulfide, necessitating the use of extremely high vacuums in order to achieve an extraction of the sulfur and other volatile constituents in the pellets. On the other hand, temperatures above about 3,100°F are undesirable because of excessive cost of refractories required. Particularly satisfactory results are achieved when the pelletized charge is heated at about 2,700°F at a vacuum of $10^{-5}$ torr to a temperature up to about 3,100°F at a vacuum of 0.1 torr, and preferably 2,800°F at 0.1 torr to 2,900°F at 3 torr.

The heating of the pelletized charge to within the desired temperature range for the thermal dissociation reaction is achieved at a rate as quickly as possible without incurring fracture or rupture of the pellets due to the rapid gasification of the moisture and volatile constituents therein, thereby producing pellets of a porous nature which become progressively more porous as the thermal dissociation reaction proceeds until a temperature is attained at which some melting occurs, resulting in a sintering and densification of the pellet. The temperature is gradually increased during the thermal dissociation reaction to permit escape of the sulfur and other volatile constituents. The reaction itself is carried out for a period of time sufficient to effect a substantially complete thermal dissociation of the feed material, the limit of which is restricted by the attainment of an equilibrium condition in which the partial pressure of sulfur in the vapor within the vacuum furnace is equal to that of the residual sulfur contaminant in the pelletized feed stock.

The equilibrium condition can be advanced in the direction toward producing briquettes containing relatively minimal amounts of residual sulfur by employing higher vacuums up to a level dictated by the limitations of the vacuum equipment employed. Under such conditions, sulfur contents ranging from as high as several percent to as low as about 0.025 percent in the resultant briquettes can be achieved which generally is considered too high, rendering the metallic briquetts unsuitable for many uses. Accordingly, at the completion of the thermal dissociation reaction, a continuation of the purification of the briquettes is achieved by a hydrogen heat treatment in which the briquettes are retained at the elevated temperature prevailing in the vacuum furnace for an additional time period during which hydrogen gas is admitted into the furnace in contacting relationship with the briquettes at pressures up to about 5 torr, whereby a further conversion and extraction of the sulfur is effected by the formation of hydrogen sulfide gas, which is withdrawn by the vacuum pump. A continuous sweep of hydrogen gas is continued during the heat treatment step which can be carried out for an additional time period of about 1 or 2 hours or until such time that the sulfur content is reduced to within a permissible range. Under conditions as hereinabove described, sintered, dense metallic molybdenum briquettes after a hydrogen heat treatment for a period of about 2 hours at a temperature between 2,800°F and 2,900°F can be produced containing a residual sulfur content of less than about 100 ppm.

It is also contemplated in the practice of the present invention that the hydrogen heat treatment step can be carried out simultaneously with the thermal dissociation reaction, as well as during the last stages thereof, whereby an acceleration of sulfur removal is effected. Under these conditions, a continuing hydrogen sweep is achieved so as to maintain a vacuum of at least about 50 torr, and preferably of at least about 10 torr in the vacuum furnace at temperatures within the normal thermal dissociation reaction range. The progress of the thermal dissociation reaction, and particularly the progress of the hydrogen heat treatment, can readily be monitored by an analysis of the gaseous products withdrawn from the furnace employing conventional detection equipment suitable for analyzing the presence of sulfur dioxide, hydrogen sulfide, carbon dioxide, carbon monoxide, nitrogen, oxygen, water, carbon or the like.

Upon completion of the heat treatment operation, the charge is permitted to cool to a temperature below about 570°F, whereafter the porous metallic molybdenum product can be exposed to air, such as by back-filling the vacuum furnace, and the product removed.

In order to further illustrate the process comprising the present invention, the following examples are provided. It will be understood that the examples as hereinafter set forth are provided for illustrative purposes and are not intended to be limiting of the invention as herein described and as defined in the subjoined claims.

EXAMPLE 1

A molybdenite concentrate derived from an oil flotation extraction beneficiation process is employed as a feed material for producing metallic molybdenum in accordance with the disclosed process. The molybdenite concentrate on analysis contains 0.15 percent iron, about 1 percent to about 2 percent water, about 6 percent to about 8 percent residual flotation oils, about 1 percent carbon and with the balance consisting essentially of molybdenum disulfide. The particulated concentrate is of a size such that 5 percent is retained on a 20 mesh screen, 10 percent is retained on a 320 mesh screen and 85 percent is less than 325 mesh (U.S. Standard Screen Size).

The concentrate feed material is preliminarily mixed with 10 percent by weight of an aqueous solution containing 10 percent sodium silicate and the resultant mixture is fed to a rotating disc-type pelletizer for producing pellets of a generally spherical configuration ranging in diameter from about one-sixteenth inch to about one-half inch in size. The resultant pellets are charged into a furnace chamber at room temperature, which subsequently is evacuated to a pressure of about 1 torr. An induction heating of the vacuum chamber and the feed material therein is thereafter effected to control the chamber to within a temperature range of about 2,700°F to about 2950°F. The thermal dissociation reaction is continued with the feed material maintained within the aforementioned temperature range for a period of one-half hour, after which a hydrogen sweep gas at a flow rate of 15 standard cubic feet per hour at atmospheric pressure is passed through the hot feed material for an additional one-half hour period. Thereafter, the heating elements are turned off and the charge allowed to slowly cool within the vacuum chamber until the temperature attained less than about 350°F, whereafter the feed material is removed. The resultant dense sintered metallic pellets recovered are analyzed and found to contain 99.6 percent molybdenum, 0.2 percent iron, 0.03 percent calcium, and 0.007 percent silicon dioxide.

EXAMPLE 2

A pelletized feed material similar to that employed in Example 1 is subjected to the thermal dissociation process employing the same equipment as described in connection with Example 1 in which the feed material is heated to a temperature of about 2,900°F and maintained at that temperature for about 2 hours, followed thereafter by a hydrogen sweep at temperature at a pressure of 2 torr for an additional one-half hour period. The final product is analyzed and found to contain only 0.006 percent sulfur.

EXAMPLE 3

A typical molybdenum disulfide concentrate similar to that described in connection with Examples 1 and 2 is subjected to a thermal dissociation reaction at a temprature of 2900°F for a period of 2 hours at a pressure of 0.9 torr, whereafter the resultant pellets are subjected to a hydrogen sweep under a pressure of 2 torr. The resultant metallic molybdenum product is analyzed and found to contain only 0.009 percent sulfur.

EXAMPLE 4

A test is conducted similar to that described in Example 3, but wherein the temperature within the evacuated chamber is 2,800°F and the pressure during the thermal dissociation reaction is 0.3 torr. The hydrogen sweep is carried out under a pressure of 2 torr in the same member as Example 3, and the resultant metallic pelletized product is found to contain 0.02 percent sulfur.

EXAMPLE 5

A test similar to that described in Examples 3 to 4 is conducted using the same feed material in which the pelletized feed stock is heated to a temperature of 2900°F for a period of 2 hours under a pressure of 0.4 torr. Thereafter, the feed material is subjected to a sweep of a gas comprising 50 percent hydrogen and 50 percent argon at a pressure of 3 torr for an additional time period and the resultant product is analyzed and found to contain 0.027 percent sulfur.

While it will be apparent that the invention herein disclosed is well calculated to achieve the benefits and advantages set forth above, it will be appreciated that the invention is susceptible to modification, variation and change without departing from the spirit thereof.

What is claimed is:

1. A process for preparing metallic molybdenum of relatively high purity which comprises the steps of agglomerating a feed material consisting essentially of a finely-particulated molybdenite concentrate consisting predominantly of molybdenum disulfide into a plurality of shape-sustaining pellets, heating said pellets to an elevated temperature ranging from about 2,500°F to about 3100°F for a period of time sufficient to effect a dissociation of substantially all of the molydenum disulfide contained therein while in a non-oxidizing atmosphere under a pressure of less than about 10 torr, continuously withdrawing the gaseous sulfur and other volatile contaminating constituents in said pellets, heat treating the residual said pellets by subjecting them to contact with hydrogen at an elevated temperature ranging from at least about 2500°F to about 3100°F in a manner to effect a further extraction of residual sulfur to a level less than about 100 ppm by a conversion thereof to hydrogen sulfide and continuously withdrawing the gaseous products thus obtained so as to maintain a pressure of less than about 5 torr, and thereafter cooling and extracting the substantially dense sintered said pellets consisting predominantly of metallic molybdenum.

2. The process as defined in claim 1, wherein the step of heating said pellets to an elevated temperature is performed under conditions in which the temperature ranges from about 2800°F at 0.1 torr to about 2900°F at about 3 torr.

3. The process as defined in claim 1, including the further step of condensing and recovering the gaseous sulfur evolved during the dissociation of the molybdenum disulfide.

4. The process as defined in claim 1, in which the heat treated said pellets are cooled to a temperature below about 570°F before the extraction thereof.

5. The process as defined in claim 1, in which said molybdenite concentrate is controlled so as to contain at least about 60 percent molybdenum disulfide.

6. The process as defined in claim 1, in which said molybdenite concentrate is controlled so as to contain at least about 80 percent molybdenum disulfide.

7. The process as defined in claim 1, in which said finely-particulated molybdenite concentrate is controlled so as to range from an average particle size of about 10 microns to about 250 microns.

8. The process as defined in claim 1, including the further step of admixing with said molybdenite concentrate a volatile binder in an amount of about 2 percent to about 10 percent prior to the step of agglomerating said concentrate.

9. The process as defined in claim 8, wherein said binder comprises molasses.

10. The process as defined in claim 1, including the further step of admixing with said finely-particulated molybdenite concentrate a controlled proportion of a volatile particulated filler material adapted to volatilize during the heating step to enhance the porosity of said pellets.

11. The process as defined in claim 10, in which said filler is of an average particle size ranging from about 10 microns to about 147 microns.

12. The process as defined in claim 1, in which the step of agglomerating said finely-particulated molybdenite concentrate is performed to produce pellets of an average particle size of from about one-sixteenth inch to about one-half inch in diameter.

13. The process as defined in claim 1, in which the step of heating said pellets to an elevated temperature is performed for a period of time ranging from about ½ to about 2 hours.

14. The process as defined in claim 1, in which the step of heat treating the residual said pellets is performed for a period of time ranging from about 1 to about 2 hours.

15. The process as defined in claim 1, wherein the step of heating said pellets and the step of heat treating said pellets is performed simultaneously under an atmosphere substantially devoid of oxygen and containing hydrogen under a pressure ranging from about 10 torr to about 50 torr.

16. The process as defined in claim 15, in which said atmosphere consists essentially of hydrogen.

* * * * *